(No Model.)
C. E. DENNY.
PROCESS OF PACKING MEAT FOR TRANSPORTATION.
No. 258,719. Patented May 30, 1882.
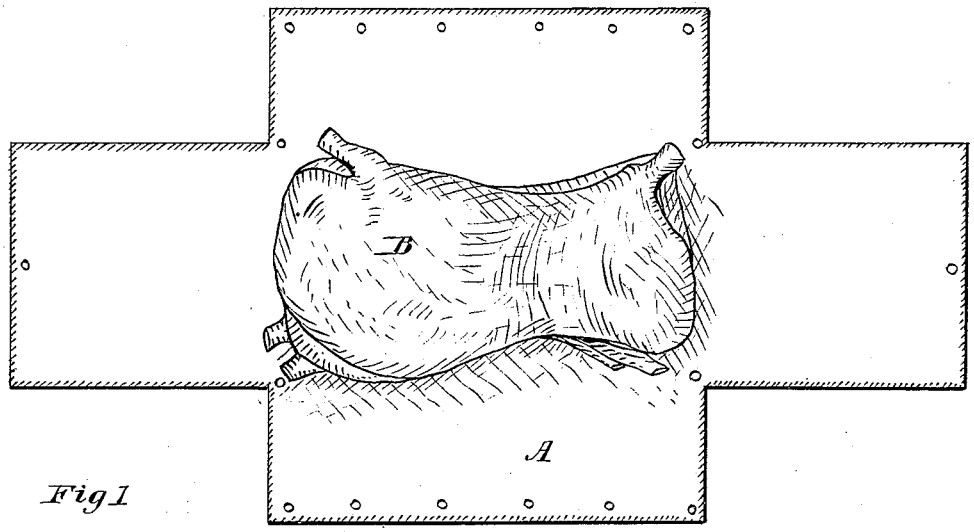
Fig 1.
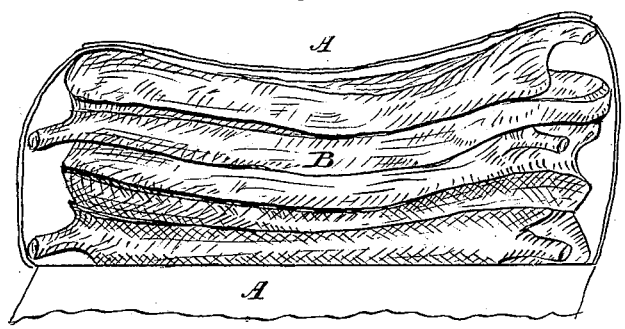
Fig 2.
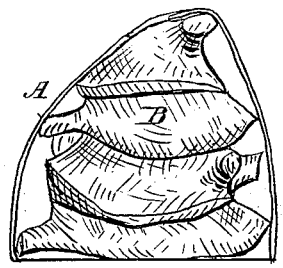
Fig 3.
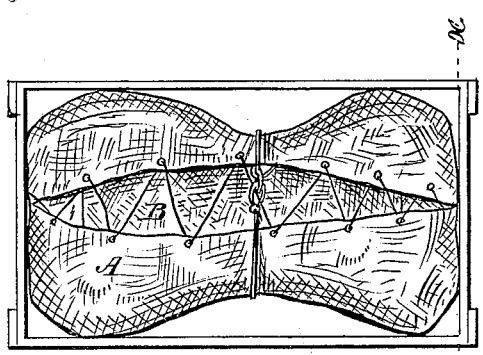
Fig 4.
Fig 5.
Witnesses
W. C. Coolies
Jno. C. MacGregor.
Inventor
Charles E. Denny
By Coburn & Thacher
Attorneys

UNITED STATES PATENT OFFICE.

CHARLES E. DENNY, OF CHICAGO, ILLINOIS.

PROCESS OF PACKING MEAT FOR TRANSPORTATION.

SPECIFICATION forming part of Letters Patent No. 258,719, dated May 30, 1882.

Application filed December 22, 1881. (No specimens.)

*To all whom it may concern:*

Be it known that I, CHARLES EDWARD DENNY, a subject of the Queen of Great Britain, and now residing at Chicago, in the county of Cook and State of Illinois, have invented a new and useful Process of Packing Meat for Transportation, as well as a new package of meat packed by my new process, of which the following is a specification.

The object of my invention is to so pack meat that it can be shipped to great distances without undergoing injurious changes; and my invention consists in packing the meat in coarse cloth with a preparation of borax, all as hereinafter fully described.

To enable those skilled in the art to fully understand and practice my invention, I will proceed to describe the same with particularity, reference being had to the accompanying drawings, in which—

Figure 1 represents a quantity of meat—as, for instance, the whole sides of a hog—placed upon the coarse cloth cut in the shape in which I use it. Fig. 2 represents a side view of one of the packages with one side and two ends of the coarse cloth wrapped about the meat. Fig. 3 represents an end view of the same package with one end and two sides of the cloth wrapped about the meat. Fig. 4 represents a top view of one of the packages of meat entirely wrapped in the coarse cloth, done up and placed in a box; and Fig. 5 shows a sectional view taken on the line $x\,x$ in Fig. 4.

It is very important that meat in transportation shall undergo as little change as possible, so as to reach its destination nearly in its original state or condition, and this object I attain by the means I will now describe.

In the accompanying drawings, A represents a coarse cloth, with four folding flaps. B represents the sides of hogs, one laid upon the other. I ordinarily pack in one cloth the entire bodies of two hogs, in the manner clearly shown in Figs. 2 and 3 of the drawings. As I place these sides of hogs one above the other I put between the pieces a small quantity of borax. I then fold the flap of the cloth over the meat and draw the edges firmly together by the use of tying strings or cords, as clearly shown in Fig. 4. I place inside of this canvas, around the meat, a small quantity of borax to preserve the meat; but care must be taken to use only such quantity as is necessary to keep the meat sweet during transportation, the wrapping of the meat in cloth permitting this, as hereinbefore described. I may then place these packages in wooden boxes, as clearly shown in Fig. 4, placing a board between the two packages, so that each separate package will be kept throughout its transportation in as nearly its original state and condition as possible.

Heretofore it has been common to transport meat unwrapped, in which case it was necessary to cure and box the meat, and use such an amount of antiseptic as would seriously impair the flavor, character, and quality of the meat. It has also been the practice to wrap up the meats in cloths which protect them from injury and keep them drier than is possible without such wrappers; but this does not preserve the meat from injurious changes. The meats have also been dried and wrapped in cloths saturated with borax solution; but this takes out the juices and makes a dry instead of a fresh article.

The object of my invention is to secure the preservative effect of the antiseptics without using the latter in such quantities as are productive of injury or impair the value of the meat as fresh meat; and this I effect by first placing a small portion of the antiseptic upon the surface of the meat, sufficient, if retained in place and not exposed to moisture, to preserve the meat, and then wrapping the latter, as described, thereby preventing to a great degree the access of moisture to the antiseptic, maintaining the strength of the latter, and keeping it in contact with the meat. I am thus enabled to transport the meat without injury, while using but a small proportion of the preservative material heretofore required.

I claim—

The mode described of packing fresh meat for transportation, the same consisting of applying a limited quantity of dry borax to the meat and wrapping the latter in coarse cloth, as set forth.

CHARLES EDWARD DENNY.

Witnesses:
JNO. C. MACGREGOR,
M. B. GAGE.